US008580415B2

(12) United States Patent
Naskali et al.

(10) Patent No.: US 8,580,415 B2
(45) Date of Patent: Nov. 12, 2013

(54) METHOD AND APPARATUS FOR AN ELECTRICAL INTERFACE

(75) Inventors: Matti Juhani Naskali, Tokyo (JP); Heikki Sakari Paananen, Prefecture (JP)

(73) Assignee: Nokia Corporation, Espoo (FI)

( * ) Notice: Subject to any disclaimer, the term of this patent is extended or adjusted under 35 U.S.C. 154(b) by 152 days.

(21) Appl. No.: 12/959,650

(22) Filed: Dec. 3, 2010

(65) Prior Publication Data

US 2012/0140430 A1   Jun. 7, 2012

(51) Int. Cl.
*H01M 10/34* (2006.01)
*H01R 13/62* (2006.01)

(52) U.S. Cl.
USPC ............. 429/65; 429/121; 439/368; 439/627

(58) Field of Classification Search
USPC ............. 429/65, 121; 439/49, 368, 500, 627
See application file for complete search history.

(56) References Cited

U.S. PATENT DOCUMENTS

| | | | |
|---|---|---|---|
| 5,093,215 A * | 3/1992 | Hasegawa et al. | 429/121 X |
| 5,496,657 A * | 3/1996 | Dixon, Jr. | 439/627 X |
| 5,912,092 A * | 6/1999 | Maruyama et al. | 429/121 X |
| 5,920,178 A | 7/1999 | Robertson, Jr. et al. | |
| 6,084,379 A | 7/2000 | Buniatyan | |
| 6,977,479 B2 | 12/2005 | Hsu | |
| 7,667,433 B1 | 2/2010 | Smith | |
| 2008/0280196 A1 * | 11/2008 | Lai | 429/121 |

FOREIGN PATENT DOCUMENTS

| | | |
|---|---|---|
| JP | 11-187581 A2 | 7/1999 |
| JP | 2006-136098 A2 | 5/2006 |
| WO | 2010-015832 A2 | 2/2010 |

OTHER PUBLICATIONS

Nokia BLB-1 Battery Pack, photograph obtained Dec. 1, 2010, 1 page.

* cited by examiner

*Primary Examiner* — Stephen J. Kalafut
(74) *Attorney, Agent, or Firm* — Harrington & Smith

(57) ABSTRACT

In accordance with an example embodiment of the present invention, an apparatus, comprises an energy storage device having an interface and at least one terminal, the interface having first and second surfaces, the first surface having at least one first surface opening and the second surface having at least one second surface opening, wherein the at least one first surface opening allows access to the at least one terminal, wherein the at least one second surface opening allows access to the at least one terminal, and wherein the at least one first surface opening is distinct from the at least one second surface opening.

21 Claims, 4 Drawing Sheets

METHOD AND APPARATUS FOR AN ELECTRICAL INTERFACE

TECHNICAL FIELD

The present application relates generally to a method and apparatus for an electrical interface.

BACKGROUND

Many electronic devices include energy storage devices such as batteries. Energy storage devices require recharging at regular intervals. Many electronic devices include the capability to recharge energy storage devices while the energy storage device is embedded within or attached to the electronic device.

SUMMARY

Various aspects of examples of the invention are set out in the claims. According to a first aspect of the present invention, apparatus, comprises an energy storage device having an interface and at least one terminal, the interface having first and second surfaces, the first surface having at least one first surface opening and the second surface having at least one second surface opening, wherein the at least one first surface opening allows access to the at least one terminal, wherein the at least one second surface opening allows access to the at least one terminal, and wherein the at least one first surface opening is distinct from the at least one second surface opening.

According to a second aspect of the present invention, a method comprises transferring electric power through at least one opening of a first surface of an interface and through at least one opening of a second surface of the interface, wherein the at least one opening of the first surface and at least one opening of the second surface allow access to the at least one terminal, and wherein the at least one opening in the first surface is distinct from the at least opening in the second surface.

According to a third aspect of the present invention, an apparatus, comprises an interface, the interface having first and second surfaces, the first surface having at least one first surface opening and the second surface having at least one second surface opening, wherein the at least one first surface opening is distinct from the at least one second surface opening.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1a through 5 of the drawings.

Figure 1A:
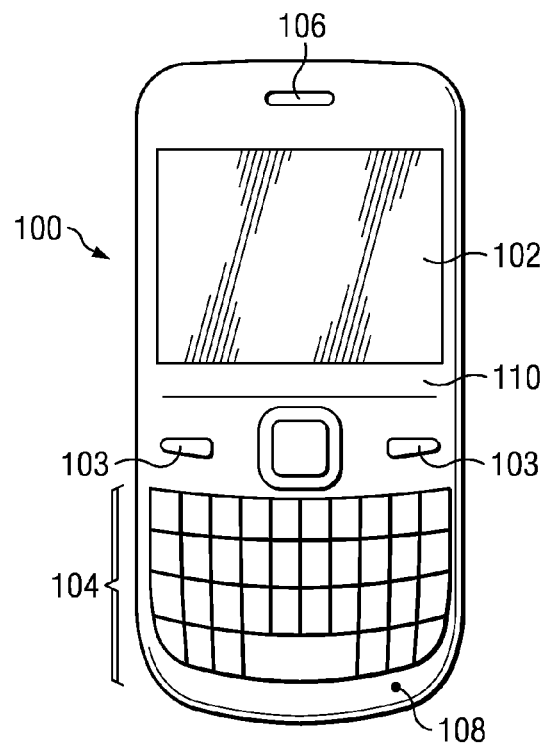
FIG. 1a is a diagram of a front side of an electronic device according to an example embodiment of the invention.

FIG. 1a is a diagram of a front side 110 of an electronic device 100 according to an example embodiment of the invention. In an embodiment, an electronic device such as electronic device 100 comprises a display such as touch screen display 102, a keyboard such as QWERTY keyboard 104, a microphone 108, a speaker 106 and multi-function keys 103.

Figure 1B:
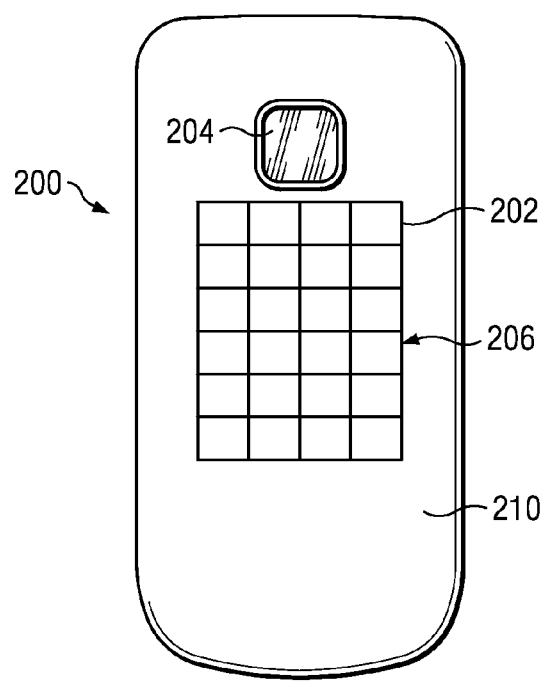
FIG. 1b is a diagram of the back side an electronic device according to an example embodiment of the invention.

FIG. 1b is a diagram of the back side 210 an electronic device 200 according to an example embodiment of the invention. In an embodiment, an electronic device such as electronic device 200 comprises a back cover such as back cover 206 and a camera such as camera 204. In an embodiment, a back cover such as back cover 206 comprises at least one solar panel such as solar panels 202, which are capable of powering the electronic device and/or a charging a battery for the electronic device. In an embodiment, electronic device 200 is electronic device 100 of FIG. 1a.

Figure 2:
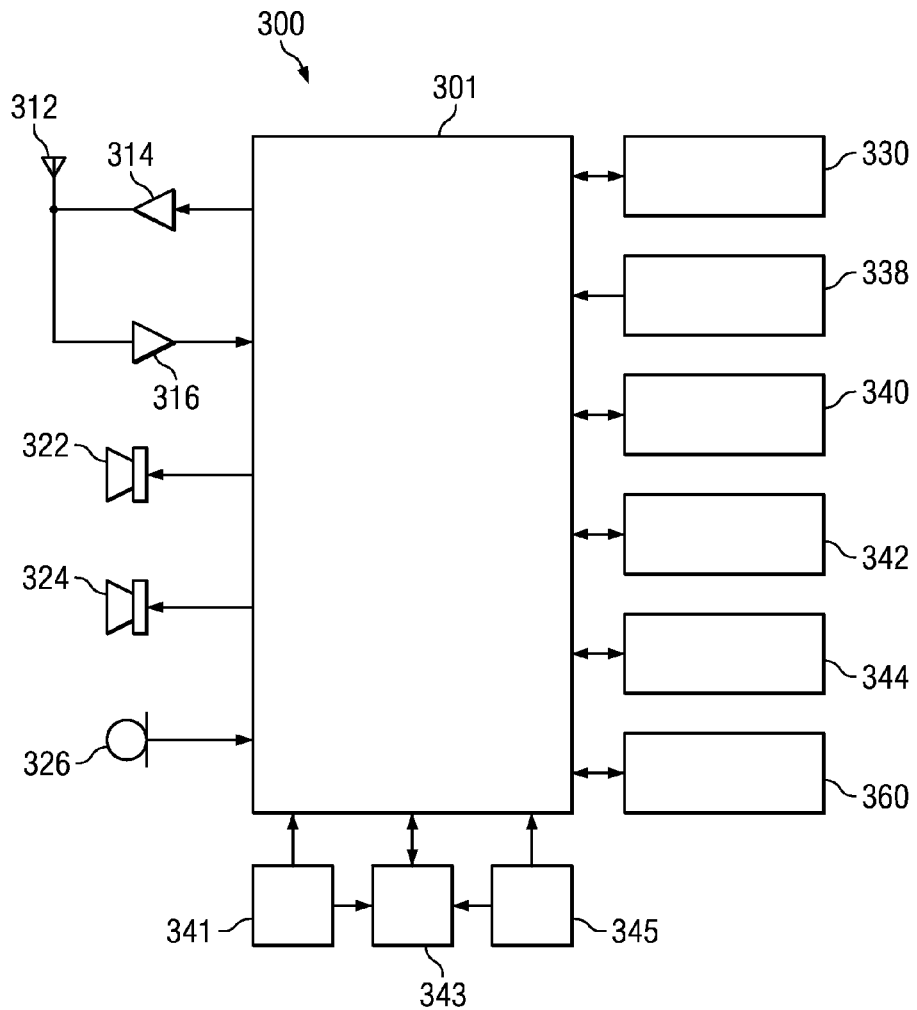
FIG. 2 is a block diagram of an electronic device according to an example embodiment of the invention.

FIG. 2 is a block diagram of an electronic device 300 according to an example embodiment of the invention. In an embodiment, electronic device 300 comprises at least one antenna 312 in communication with a transmitter 314 and a receiver 316. Electronic device 300 further comprises a processor 301 and/or one or more other processing components. Processor 301 provides at least one signal to the transmitter 314 and receives at least one signal from the receiver 316. Further, electronic device 300 may comprise user interface elements that include one or more input elements and/or output elements, such as an earphone or speaker 324, a ringer 322, a microphone 326, a keypad 338, touch pad 340, display 330 and/or the like. In an embodiment, the user interface elements are coupled with processor 301. In an embodiment, display 330 may be a touch screen, liquid crystal display, and/or the like capable of displaying text and/or graphical information. In an embodiment, the electronic device 300 further comprises a GPS receiver 360 capable of determining the location of electronic device 300. In an embodiment, the electronic device 300 further comprises an energy storage device 343 such as a vibrating battery pack for powering various circuits, which operate electronic device 300. Electronic device 300 further comprises a volatile memory 342 and a non-volatile memory 344 coupled with processor 320.

In an embodiment, electronic device 300 further comprises at least one solar panel 341 for powering electronic device 300 and/or for charging energy storage device 343. In an embodiment, at least one solar panel 341 is the at least one solar panel 202 of FIG. 1b. In an embodiment, at least one solar panel 341 is attached and/or combined with a part of the electronic device 300 such as cover 500 of FIG. 4a. In an embodiment, electronic device 300 further comprises a wireless charging component 345 to enable wireless charging of the electronic device. In an embodiment, wireless charging component 345 is capable of providing power for electronic device 300. In an embodiment, wireless charging component 345 is capable of charging energy storage device 343.

Figure 3A:
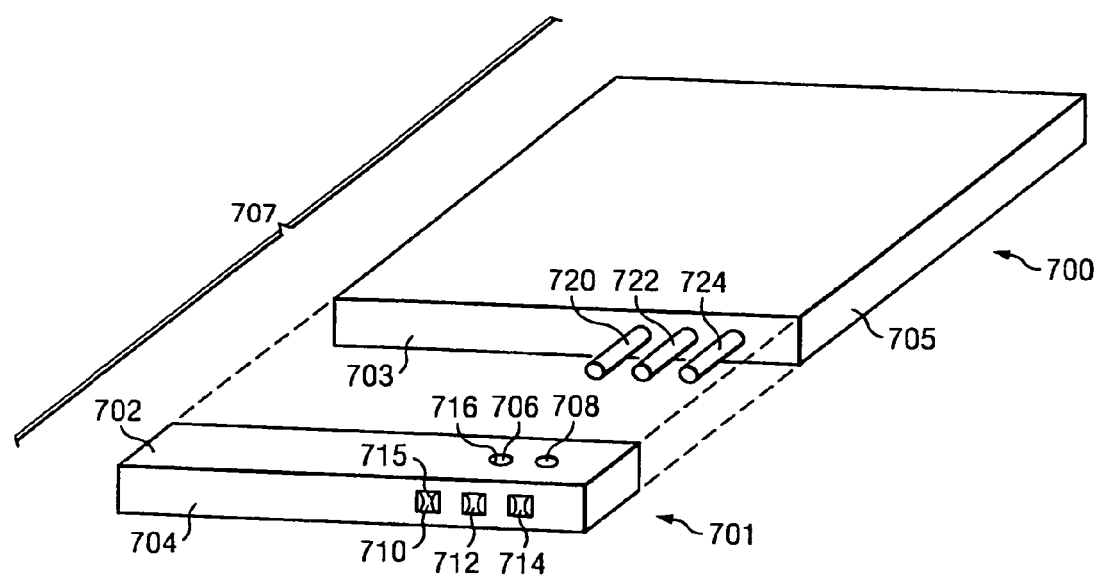
FIG. 3a is a diagram of an energy storage device and an interface according to an example embodiment of the invention.

FIG. 3a is a diagram of an energy storage device 700 and an interface 701 according to an example embodiment of the invention. In an embodiment, energy storage device 700 comprises a battery such as a lithium polymer battery, lithium ion battery, and/or the like. However, energy storage device 700 may be any type of battery or other apparatus with energy storage capability. In an embodiment, energy storage device 700 comprises a housing 705 and at least one terminal such as terminals 720, 722 and 724. However, energy storage device 700 may comprise any number and configuration of terminals. In an embodiment, a terminal is an electrical contact point made of a conductive material, which is capable of enabling the transfer of power from an energy storage device. In an embodiment, a terminal is a battery terminal comprising a positive, negative or ground battery terminal.

In an embodiment, energy storage device 700 comprises terminals 720, 722 and 724 in a single row, which extend outwardly from side 703 of energy storage device. In an embodiment, terminals 720, 722 and 724 are ground, positive and negative terminals, respectively. In an embodiment, energy storage device 700 is energy storage device 343 of FIG. 2.

In an embodiment, an interface such as interface 701 has a front surface 704 and a top surface 702. In an embodiment, front surface 704 comprises at least one opening such as openings 710, 712 and 714. In an embodiment, the at least one opening of front surface 704 allows access to at least one terminal of energy storage device 700, such as terminals 720, 722 and 724. In an embodiment, openings 712 and 714 allow access to positive and negative terminals of the energy storage device, respectively such as terminals 722 and 724. In an embodiment, opening 710 allows access to a ground terminal of a battery such as terminal 720.

In an embodiment, top surface 702 comprises at least one opening such as openings 706 and 708. In an embodiment, the at least one opening allows access to at least one terminal of the energy storage device 700. For example, in an embodiment, openings 706 and 708 allow access to terminals 722 and 724, respectively. In an embodiment, the at least one opening on the front surface 704 is distinct from the at least one opening on the top surface 702.

In an embodiment, energy storage device 700 comprises interface 701. In an embodiment, interface 701 couples energy storage device. In an embodiment, interface 701 is detachable from energy storage device 700. In another embodiment, interface 701 is not detachable from energy storage device 700. In an embodiment, interface 701 and energy storage device 700 have the same molded housing.

In an embodiment, apparatus 707 comprises energy storage device 700 having an interface such as interface 701 and at least one terminal such as terminal 724, the interface having first and second surfaces such as surfaces 704 and 702, respectively, the first surface having at least one first surface opening such as opening 714 and the second surface having at least one second surface opening such as opening 708, wherein the at least one first surface opening allows access to the at least one terminal such as terminal 724, wherein the at least one second surface opening allows access to the at least one terminal, and wherein the at least one first surface opening is distinct from the at least one second surface opening.

In an embodiment, an advantage of the at least one first surface opening being distinct from the at least one second surface opening is that a contact or a connector, which may fit into an opening, will have a mechanically reliable fit with the opening.

In an embodiment, the at least one terminal comprises two terminals, the at least one first surface opening comprises two first surface openings, and the at the at least one second surface opening comprises two second surface openings. In an embodiment, one of the two first surface openings allows access to another one of the two terminals and another one of the two first surface openings allows access to another one of the two terminals. In an embodiment, one of the two second surface openings allows access to one of the two terminals and another one of the two second surface openings allows access to another one of the two terminals.

In an embodiment, the at least one first surface opening comprises one first surface opening and the one first surface opening allows access to each of the at least one terminal. In an embodiment, the at least one second surface opening comprises one second surface opening and the one second surface opening allows access to each of the at least one terminal.

In an embodiment, the first and second surfaces are adjacent surfaces of the interface. In another embodiment, the first and second surfaces are opposite surfaces of the interface. In an embodiment, the at least one first surface opening is proximate to an edge of the interface. In an embodiment, the at least one second surface opening is proximate to an edge of the interface.

In an embodiment, the at least one first surface opening comprises at least two first surface openings and the at least two first surface openings are proximate to each other.

In an embodiment, the at least one first surface opening comprises at least one + such as connector 715. In an embodiment, the at least one second surface opening comprises at least one connector such as connector 716.

In an embodiment, the apparatus 707 comprises an interface, the interface having first and second surfaces, the first surface having at least one first surface opening and the second surface has at least one second surface opening, wherein the at least one first surface opening is distinct from the at least one second surface opening.

Figure 3B:
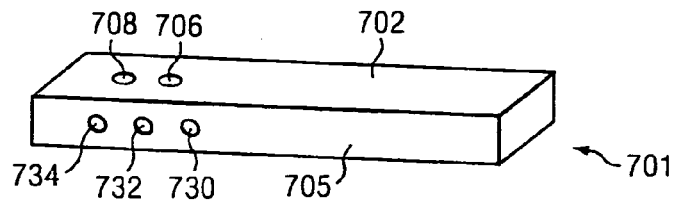
FIG. 3b is a diagram of the interface of FIG. 3a according to an example embodiment of the invention.

FIG. 3b is a diagram of the interface 701 of FIG. 3a according to an example embodiment of the invention. In an embodiment, interface 701 has a back surface 705 and a top surface 702. In an embodiment, back surface 705 comprises at least one opening such as openings 734, 732 and 730. In an embodiment, the at least one opening of back surface 705 interfaces with at least one terminal of energy storage device 700, such as terminals 720, 722 and 724. In an embodiment, openings 732 and 734 interface with positive and negative terminals of the energy storage device, respectively such as terminals 722 and 724. In an embodiment, opening 730 interfaces with a ground terminal of a battery such as terminal 720. In an embodiment, the at least one opening on the back surface 705 is distinct from the at least one opening on the top surface 702.

Figure 4A:
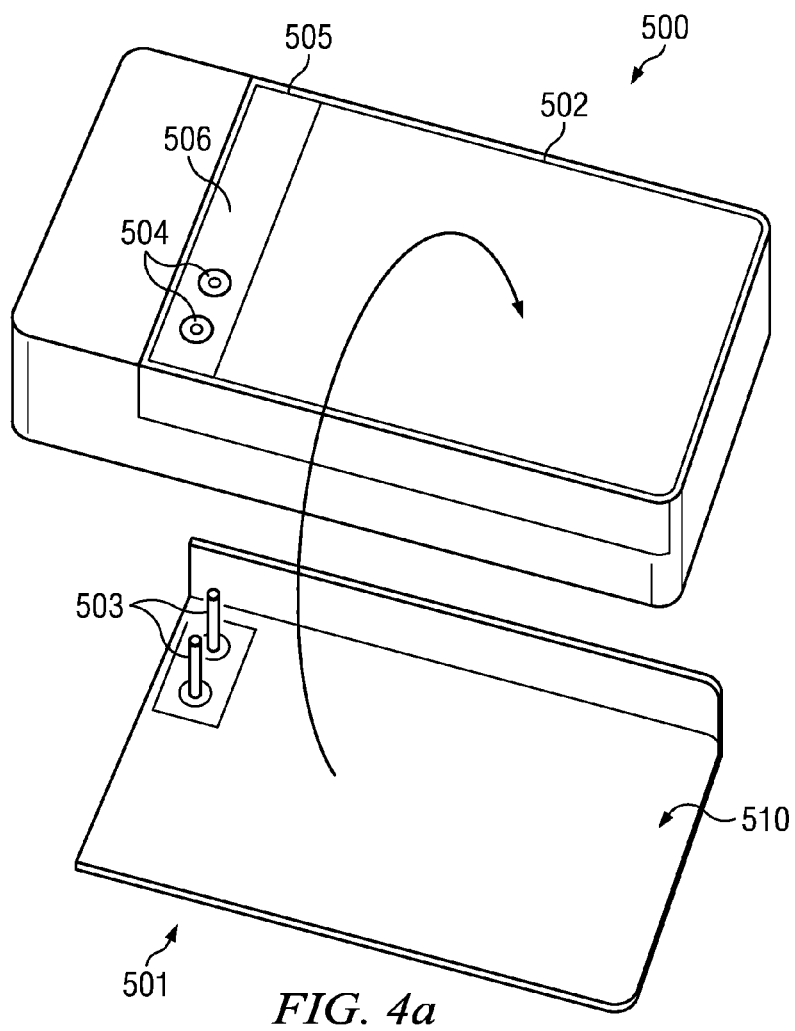
FIG. 4a is a diagram of a back side of an electronic device with a cover removed exposing an energy storage device according to an example embodiment of the invention.

FIG. 4a is a diagram of a back side of an electronic device 500 with a cover 501 removed exposing an energy storage device 502 and an interface 505 according to an example embodiment of the invention. In an embodiment, energy storage device 502 is energy storage device 700 of FIG. 3a. In an embodiment, interface 505 is interface 701 of FIG. 3a. In an embodiment, energy storage device 502 is a battery such as a lithium polymer battery, lithium ion battery, and/or the like. However, energy storage device 502 may be any type of battery or other apparatus with energy storage capability.

In an embodiment, interface 505 has a top surface 506. In an embodiment, top surface 506 comprises at least one opening such as openings 504. Openings 504 allow access to at least one terminal of energy storage device 502, such as positive and negative terminals.

Figure 5:
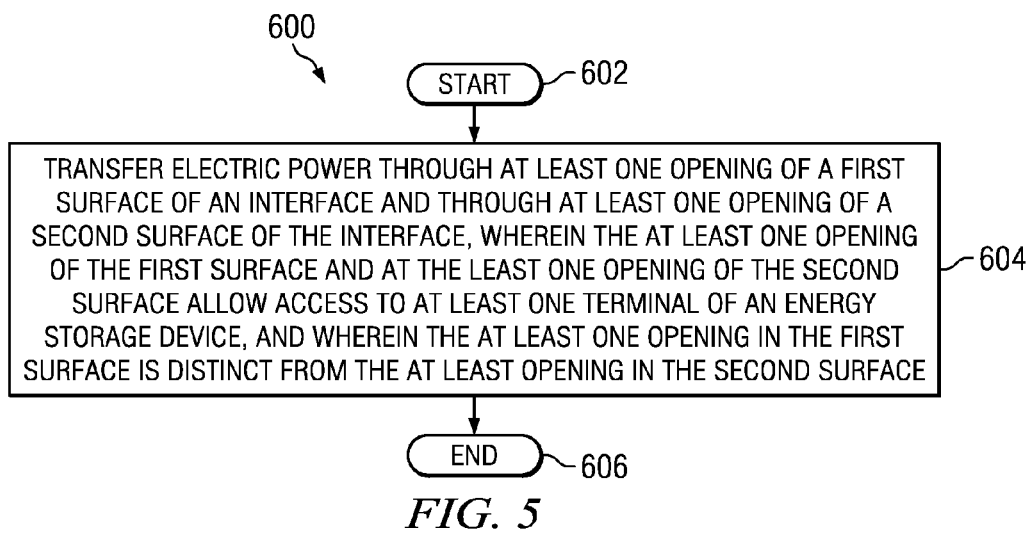
FIG. 5 is a flow diagram of a method for transferring electric power through an interface according to an example embodiment of the invention.
Figure 4B:
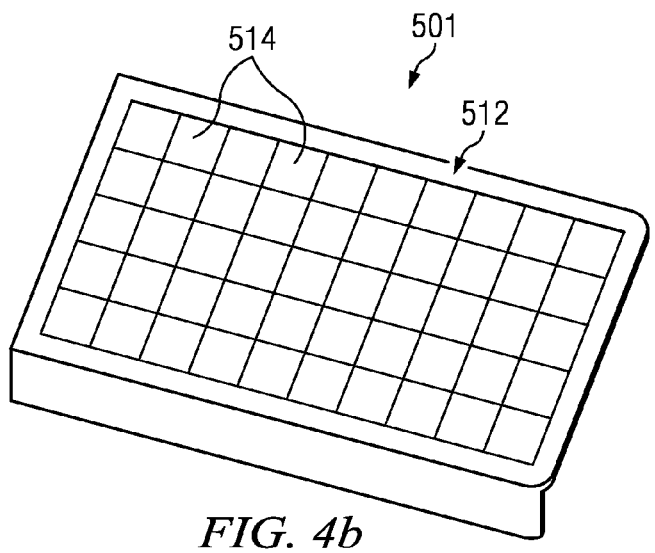
FIG. 4b is a diagram of the cover of FIG. 4a showing an exterior surface having at least one solar panel according to an embodiment of the invention.

In an embodiment, a cover for an electronic device such as cover 501 has an interior surface 510 and at least one electrical contact such as electrical contacts 503. In an embodiment, when cover 501 is attached with electronic device 500, electrical contacts 503 fit into openings 504 to form an electrical connection with at least one of the energy storage device 502 and the electronic device 500. In an embodiment, cover 501 comprises at least one solar panel such as solar panels 514 of FIG. 4*b*, which is capable of powering electronic device 500 and/or charging energy storage device 500. In an embodiment, cover 501 comprises a wireless power transfer device such as a wireless charger capable of powering electronic device 500 and/or charging energy storage device 500. FIG. 4*b* is a diagram of the cover 501 of FIG. 4*a* showing an exterior surface 512 having at least one solar panel 514 according to an embodiment of the invention FIG. 5 is a flow diagram 600 of a method for transferring electric power through an interface such as the interface 701 of FIG. 3*a* according to an example embodiment of the invention. The method begins at 602. In an embodiment, at 604, electric power is transferred through at least one opening such as opening 714 of FIG. 3*a* of a first surface of an interface such as surface 704 and through at least one opening such as opening 708 of a second surface of the interface such as surface 702. In the embodiment, the at least one opening of the first surface and the at least one opening of the second surface allow access to at least one terminal such as terminal 724 of FIG. 3*a* of an energy storage device such as energy storage device 700. Further, in the embodiment, the at least one opening in the first surface is distinct from the at least one opening in the second surface. The method ends at 606.

In an embodiment, one of the at least one opening of the first surface allows access to one of the at least one terminal, and another one of the at least one opening of the first surface allows access to another one of the at least one terminal.

In an embodiment, one of the at least one opening of the second surface allows access to one of the at least one terminal, and another one of the at least one opening of the second surface allows access to another one of the at least one terminal.

In an embodiment, the at least one opening of the first surface comprises one opening, and the one opening allows access to each of the at least one terminal through the first surface. In an embodiment, the first and second surfaces are adjacent surfaces of the interface.

Without in any way limiting the scope, interpretation, or application of the claims appearing below, a technical effect of one or more of the example embodiments disclosed herein is to provide an interface capable of effectively interfacing an electronic device, energy storage device and another device combined with a cover for the electronic device such as at least one solar panel and/or wireless power transfer device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
an energy storage device having an interface and at least one terminal, said interface having first, second, and third surfaces, said first surface having at least one first surface opening, said second surface having at least one second surface opening, and said third surface having at least one third surface opening, wherein said at least one first surface opening allows access to said at least one terminal, wherein said at least one second surface opening allows access to said at least one terminal, wherein said at least one first surface opening is distinct from said at least one second surface opening, and wherein said at least one third surface opening is not in communication with said at least one second surface opening.

2. An apparatus according to claim 1, wherein said at least one terminal comprises two terminals, and wherein said at least one first surface opening comprises two first surface openings, and wherein said at least one second surface opening comprises two second surface openings.

3. An apparatus according to claim 2, wherein one of said two first surface openings allows access to one of said two terminals, and wherein another one of said two first surface openings allows access to another one of said two terminals.

4. An apparatus according to claim 3, wherein one of said two second surface openings allows access to one of said two terminals, and wherein another one of said two second surface openings allows access to another one of said two terminals.

5. An apparatus according to claim 1, wherein said apparatus is a battery.

6. An apparatus according to claim 1, wherein said at least one first surface opening comprises one first surface opening, and wherein said one first surface opening allows access to each of said at least one terminal.

7. An apparatus according to claim 1, wherein said at least one second surface opening comprises one second surface opening, and wherein said one second surface opening allows access to each of said at least one terminal.

8. An apparatus according to claim 1, wherein said first and second surfaces are adjacent surfaces of said interface.

9. An apparatus according to claim 1, wherein said first and second surfaces are opposite surfaces of said interface.

10. An apparatus according to claim 1, wherein said at least one first surface opening is proximate to an edge of said interface.

11. An apparatus according to claim 1, wherein said at least one second surface opening is proximate to an edge of said interface.

12. An apparatus according to claim 1, wherein said at least one first surface opening comprises at least two first surfaces openings and wherein said at least two first surface openings are proximate to each other.

13. An apparatus according to claim 1, wherein said at least one first surface opening comprises at least one connector.

14. An apparatus according to claim 1, wherein said at least one second surface opening comprises at least one connector.

15. An electronic device, comprising said apparatus according to claim 1 and a cover configured to interface with said apparatus.

16. A method, comprising:
transferring electric power through at least one opening of a first surface of an interface, through at least one opening of a second surface of said interface, and through at least one third surface of said interface, wherein said at least one opening of said first surface and at least one opening of said second surface allow access to said at least one terminal, wherein said at least one opening in said first surface is distinct from said at least opening in said second surface, and wherein said at least one third surface opening is not in communication with said at least one second surface opening.

17. A method according to claim 16, wherein one of said at least one opening of said first surface allows access to one of said at least one terminal, and wherein another one of said at least one opening of said first surface allows access to another one of said at least one terminal.

18. A method according to claim 17, wherein one of said at least one opening of said second surface allows access to one of said at least one terminal, and wherein another one of said at least one opening of said second surface allows access to another one of said at least one terminal.

19. A method according to claim 16, wherein said at least one opening of said first surface comprises one opening, and wherein said one opening allows access to each of said at least one terminal through said first surface.

20. A method according to claim 16, wherein said first and second surfaces are adjacent surfaces of said interface.

21. An apparatus, comprising:
an interface, said interface having first, second, and third surfaces, said first surface having at least one first surface opening, said second surface having at least one second surface opening, and said third surface having at least one third surface opening, wherein said at least one first surface opening is distinct from said at least one second surface opening and wherein said at least one third surface opening is not in communication with said at least one second surface opening.

* * * * *